Aug. 28, 1928.
W. G. BJORKSTEDT
1,681,921
METHOD OF TREATING ALUMINUM CONTAINING MINERALS
Filed Jan. 26, 1927
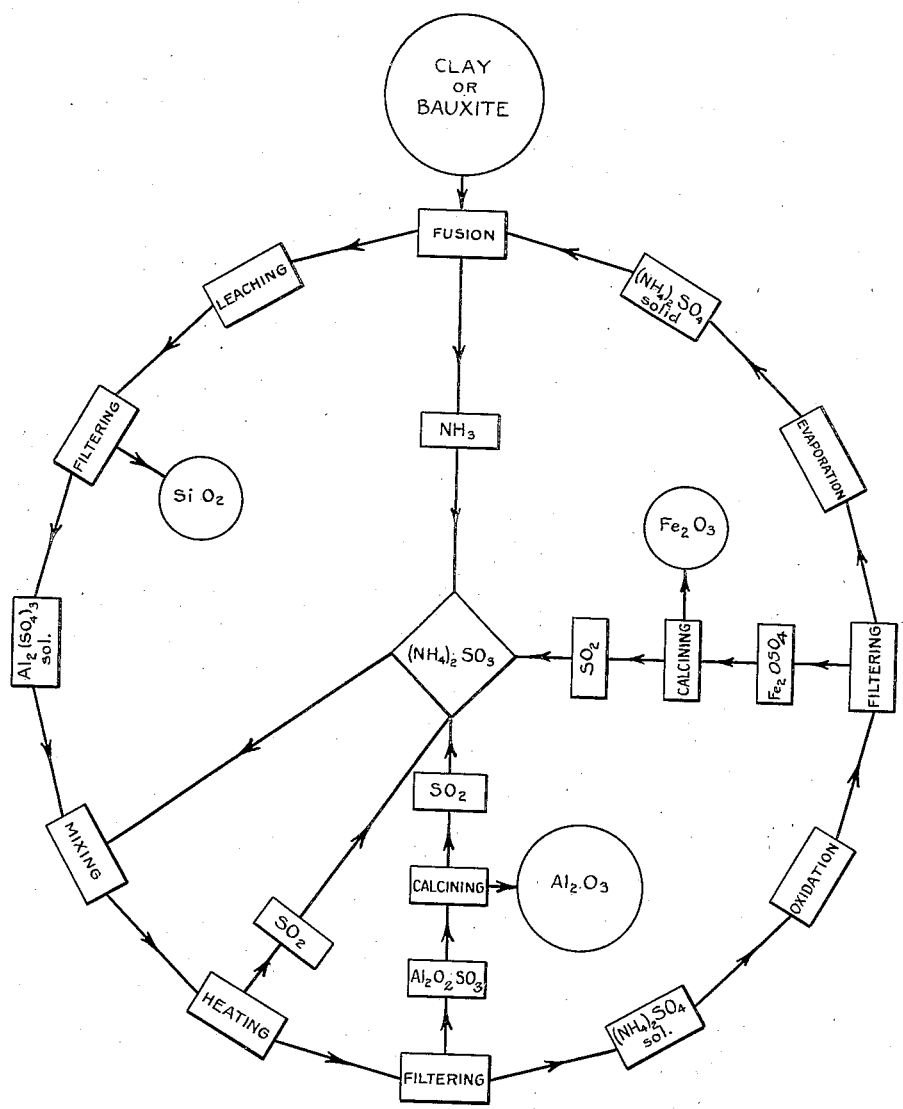
WILLIAM G. BJORKSTEDT,
INVENTOR
ATTORNEY Patented Aug. 28, 1928.

1,681,921

UNITED STATES PATENT OFFICE.

WILLIAM G. BJORKSTEDT, OF JAMAICA, NEW YORK.

METHOD OF TREATING ALUMINUM-CONTAINING MINERALS.

Application filed January 26, 1927. Serial No. 163,604.

This invention relates to the production of alumina from its minerals, more particularly to a method for economically extracting the same from various types of aluminum containing minerals such as clay, diaspor, bauxite, hydrargillite, leucite, greensand, alunite, residues from the treatment of such minerals as alunite, feldspar or other silicate rocks, and the like.

Up to the present time the principal method used for the production of alumina from its ores consisted in the so-called Bayer method, wherein bauxite, which is principally free alumina mixed with varying amounts of impurities was treated with caustic soda, whereby sodium aluminate was formed from which alumina was later precipitated by carbon dioxide. This method was satisfactory in the treatment of ores such as bauxite, but such ores are becoming relatively scarcer and of poorer quality so that it is desirable to provide a method for treating such poor ores as well as other ores of aluminum which are more plentiful and which are more readily accessible.

The Bayer process was not adapted for the treatment of any ores other than bauxite and a number of methods have been proposed for the treatment of such ores as clay and alunite for the production of pure alumina. Among such methods was one which included the grinding of the ore and then subjecting the same to an aqueous solution of sulphur dioxide in a closed vessel under pressure at a relatively high temperature in order to bring the aluminum into a solution as a soluble salt. The solution was freed from the insoluble matter and alumina precipitated therefrom, but this process was so delicately balanced that it was practically impossible to extract the alumina completely from the ore, and the resulting product was contaminated with other impurities.

Another method for extracting aluminum from its ores consisted in heating the ore with an ammonium salt, whereby an aluminum ammonium alum was formed, the product being crystallized out of the solution and then purified by re-crystallization. This method was applicable to the formation of alum but was not adapted for the production of alumina for various reasons. Other methods have also been proposed but none of these has become commercial.

My invention is adapted to avoid the difficulties inherent in the treatment of aluminum containing ores, it being among the objects thereof to provide a simple and economical method of obtaining alumina from its ores in a sufficiently pure state to be used for the production of aluminum.

The accompanying drawing constituting a part hereof is a diagrammatic chart or flow sheet illustrating the several important steps of my process.

In carrying out the invention, I mix clay, for example, with ammonium sulphate, and heat the mixture to a sufficiently high temperature to decompose the ammonium sulphate into ammonium bisulphate and ammonia according to the following formula.

$$(NH_4)_2SO_4 = NH_4H.SO_4 + NH_3 \quad (1)$$

The ammonium bisulphate attacks the clay, forming aluminum sulphate, silica and ammonium sulphate.

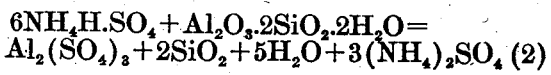
$$6NH_4H.SO_4 + Al_2O_3.2SiO_2.2H_2O =$$
$$Al_2(SO_4)_3 + 2SiO_2 + 5H_2O + 3(NH_4)_2SO_4 \quad (2)$$

As soon as the reaction begins, the equlibrium in (1) is disturbed, the newly formed neutral $(NH_4)_2SO_4$ of equation (2) is decomposed according to (1), and more clay is decomposed. The reaction proceeds therefore until all the ammonium sulphate has been consumed, and the final result may be expressed by the following formula:

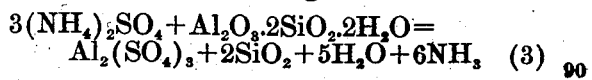
$$3(NH_4)_2SO_4 + Al_2O_3.2SiO_2.2H_2O =$$
$$Al_2(SO_4)_3 + 2SiO_2 + 5H_2O + 6NH_3 \quad (3)$$

As the temperature of the heating is in practice up to about 600° F., the silica becomes at this temperature dehydrated, and is rendered insoluble. In order to insure a complete dehydration, an excess of ammonium sulphate over that required to convert all the bases into sulphates is preferably used. In case an excess of ammonium sulphate is not used, the acid condition which is desirable for the complete dehydration of the silica, may be obtained by adding sulphuric acid to the mixture before fusion. Or hydrochloric acid may be added after the fusion and the latter mixture heated. The hydrochloric acid is recovered and may be used again.

The mixture of aluminum sulphate and insoluble residue, consisting of silica, sand and other undecomposed minerals, is now leached with water, nearly neutralized, if desired, with part of the ammonia, given off during the fusion, in order to minimize the corrosive action on the filtering devices, and filtered, when a solution consisting substantially of aluminum sulphate, free from silica, is obtained. Due, however, to the impurities in the clay, this solution contains also other sulphates, in small amounts, mainly ferric sulphate, potassium sulphate, sodium sulphate, magnesium sulphate, a very small amount of calcium sulphate and occasionally a very small amount of titanium sulphate.

If titanium is present, this can now be removed by making the solution slightly acid, and boiling it, when titanium oxide, $TiO_2$, will be precipitated. The bulk of the titanium, however, as well as the calcium, will remain in the insoluble residue after filtering the aluminum sulphate solution.

As one object of the invention is to obtain aluminum oxide substantially free from iron, the next step, after filtering off the $TiO_2$, consists in precipitating an insoluble aluminum compound, at the same time leaving the iron in solution. To this end, the solution of the sulphates is mixed with a solution of ammonium sulphite preferably containing an excess of sulphur dioxide, and the resulting mixture heated to or near its boiling point. This results in the formation of a precipitate of basic aluminum sulphite with evolution of sulphur dioxide, while the iron, in the form of ferrous compounds, stays in solution.

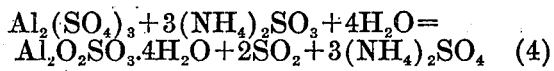
$$Al_2(SO_4)_3 + 3(NH_4)_2SO_3 + 4H_2O = Al_2O_2SO_3 \cdot 4H_2O + 2SO_2 + 3(NH_4)_2SO_4 \quad (4)$$

This precipitate of basic aluminum sulphite is now filtered off, preferably with the exclusion of air, and calcined, when aluminum oxide, free from silica and iron, is obtained.

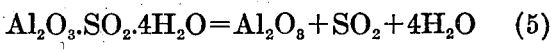
$$Al_2O_3 \cdot SO_2 \cdot 4H_2O = Al_2O_3 + SO_2 + 4H_2O \quad (5)$$

The filtrate contains the iron in solution, the whole of the ammonium sulphate, and small amounts of other soluble sulphates, such as magnesium sulphate. It is oxdized by blowing in air, while concentrating it, when the iron is precipitated as basic ferric sulphate. If desired, some of the ammonia given off in the first fusion may be added to effect a more complete precipitation. The basic ferric sulphate is filtered off, and calcined, in order to recover the sulphur dioxide it contains. The filtrate consisting of ammonium sulphate with a small amount of magnesium, potassium and sodium sulphates is evaporated to dryness. As the magnesium and other sulphates will gradually accumulate in the filtrate, they may be separated from the ammonium sulphate by fractional crystallization when they have reached a certain concentration.

Besides obtaining substantially pure aluminum oxide, the object of the invention is also to conduct the operations in such a way that important improvements in the economy of the process are effected. As will be understood from the foregoing, this is done by automatically regenerating the ammonium sulphate. It is recovered when the ammonium sulphite is made to react with the aluminum sulphate, and after the iron has been removed by oxidation, the solution is evaporated to dryness, and the ammonium sulphate used to decompose more clay.

The ammonium sulphite which is used to recover the ammonium sulphate is in its turn recovered by combining, in the presence of water, the ammonia given off when fusing the ammonium sulphate with the clay, with the sulphur dioxide given off during the following three operations.

1. Heating the mixture of aluminum sulphate and ammonium sulphite.
2. Calcining the basic aluminum sulphite.
3. Calcining the basic ferric sulphite.

It will thus be seen that on the whole, no raw materials except the clay itself, and the initial batches of ammonium sulphate and sulphur dioxide, are necessary. Some small losses might occur in handling the ammonium sulphate, and a small proportion of the ammonium sulphate will be used for forming magnesium, calcium, titanium and other sulphates. The latter losses may be replaced by the addition of the calculated amount of sulphuric acid to form the said sulphates.

Instead of fusing aluminum-bearing materials directly with ammonium sulphate, I consider it also within the scope of the invention to first decompose the ammonium sulphate by heat, to form ammonium bisulphate, add water to it, and use this liquid for leaching easily decomposable minerals and materials, such as greensand, leucite etc.

Although I have described my invention setting forth a series of operations which I considered desirable for producing pure alumina and other by-products, it is to be understood that my invention is not limited to the exact sequence of steps given and it is feasible to combine or to eliminate certain of the steps of the process within the scope of my invention.

For example, in the precipitation of the aluminum as sulphite by means of neutral ammonium sulphite from the solution of aluminum sulphate it is not absolutely essential that the procedure take place in two steps, namely, the mixing of the ammonium sulphite with aluminum sulphate solution and then heating, as under some conditions it is feasible to combine the mixing and heating in a single step. If ammonium bi-sulphite is added to a hot or boiling solution of aluminum sulphate there is a temporary formation of soluble aluminum acid sulphite which is immediately decomposed by the high temperature with the liberation of sulphur dioxide and the precipitation of basic aluminum sulphite.

In view thereof I may modify the process by providing ammonium bi-sulphite or by leading into the aluminum sulphate solution the proper amounts of sulphur dioxide and ammonia. This may be done either in cold or hot solutions and a precipitate of basic aluminum sulphite may be obtained directly even without the evolution of sulphur dioxide.

If the amount of iron in the ore is very small I may eliminate the steps involving the production of ferric oxide and thus simplify the process to a considerable extent. If titanium is present in only small amounts I avoid the necessity of the special treatment given above for the precipitation thereof at early stages of the operation.

As a result of my invention, it is clear that I have provided a very simple process for the production of alumina from its ores which consists essentially in first heating the ore, such as clay for example, with a sulphate preferably ammonium sulphate, to render the aluminum soluble, bringing the aluminum salt thus formed into solution and precipitating the same with a sulphite preferably ammonium sulphite.

My process gives rise at several stages thereof to ammonia gas and sulphur dioxide which are combined to form ammonium sulphite, which then goes back into the process. As a result, with the exception of losses which take place incidentally in the system, the whole operation is cyclic and it is merely necessary to supply the aluminum containing ore and remove therefrom the products such as alumina, silica, ferric oxide and the like. If the ore contains minor amounts of such impurities as magnesium and calcium there is a slight incidental loss of sulphuric acid which must be replaced.

These and various other changes and modifications may be made in my invention within the scope thereof as defined in the claims appended hereto.

What I claim is:

1. A method of treating aluminum containing minerals which comprises heating the same with ammonium sulphate and bringing the aluminum into solution and then precipitating the same with ammonium sulphite.

2. A method of treating aluminum containing minerals which comprises heating the same with ammonium sulphate in excess and bringing the aluminum into solution and then precipitating the same with ammonium sulphite.

3. A method of treating aluminum containing minerals which comprises heating the same with ammonium sulphate and an acid and bringing the aluminum into solution and then precipitating the same with ammonium sulphite.

4. A method of treating aluminum containing minerals which comprises heating the same with ammonium sulphate and sulphuric acid and bringing the aluminum into solution and then precipitating the same with ammonium sulphite.

5. A method of treating aluminum containing minerals which comprises heating the same with ammonium sulphate and bringing the aluminum into solution, filtering and then precipitating the same with ammonium sulphite.

6. A method of treating aluminum containing minerals which comprises heating the same with ammonium sulphate and bringing the aluminum into solution, filtering and then precipitating the same with ammonium sulphite and calcining the precipitate to produce alumina.

7. A method of treating aluminum containing minerals which comprises heating the same with ammonium sulphate and bringing the aluminum into solution, filtering, treating the solution with ammonium sulphite to form acid aluminum sulphite and heating to precipitate basic aluminum sulphite.

8. A method of treating aluminum containing minerals which comprises heating the same with ammonium sulphate and bringing the aluminum into solution, filtering, treating the solution with ammonium sulphite to form acid aluminum sulphite and heating to precipitate basic aluminum sulphite and calcining the precipitate to produce alumina.

9. A method of treating aluminum containing minerals which comprises heating the same with ammonium sulphate and bringing the aluminum into solution, filtering and then precipitating the same with ammonium sulphite and calcining the precipitate to produce alumina and combining ammonia and sulphur dioxide given off in the above treatment to form ammonium sulphite.

10. A method of treating aluminum containing minerals which comprises heating the same with ammonium sulphate and bringing the aluminum into solution, nearly neutralizing the solution, heating the same, filtering, and then precipitating the aluminum with ammonium sulphite.

In testimony whereof, I have hereunto subscribed my name this 21st day of January, 1927.

WILLIAM G. BJORKSTEDT.